Jan. 11, 1966 R. L. FERRIS 3,228,641
FOLDABLE FIFTH WHEEL STANCHION
Filed Sept. 11, 1964 4 Sheets-Sheet 1
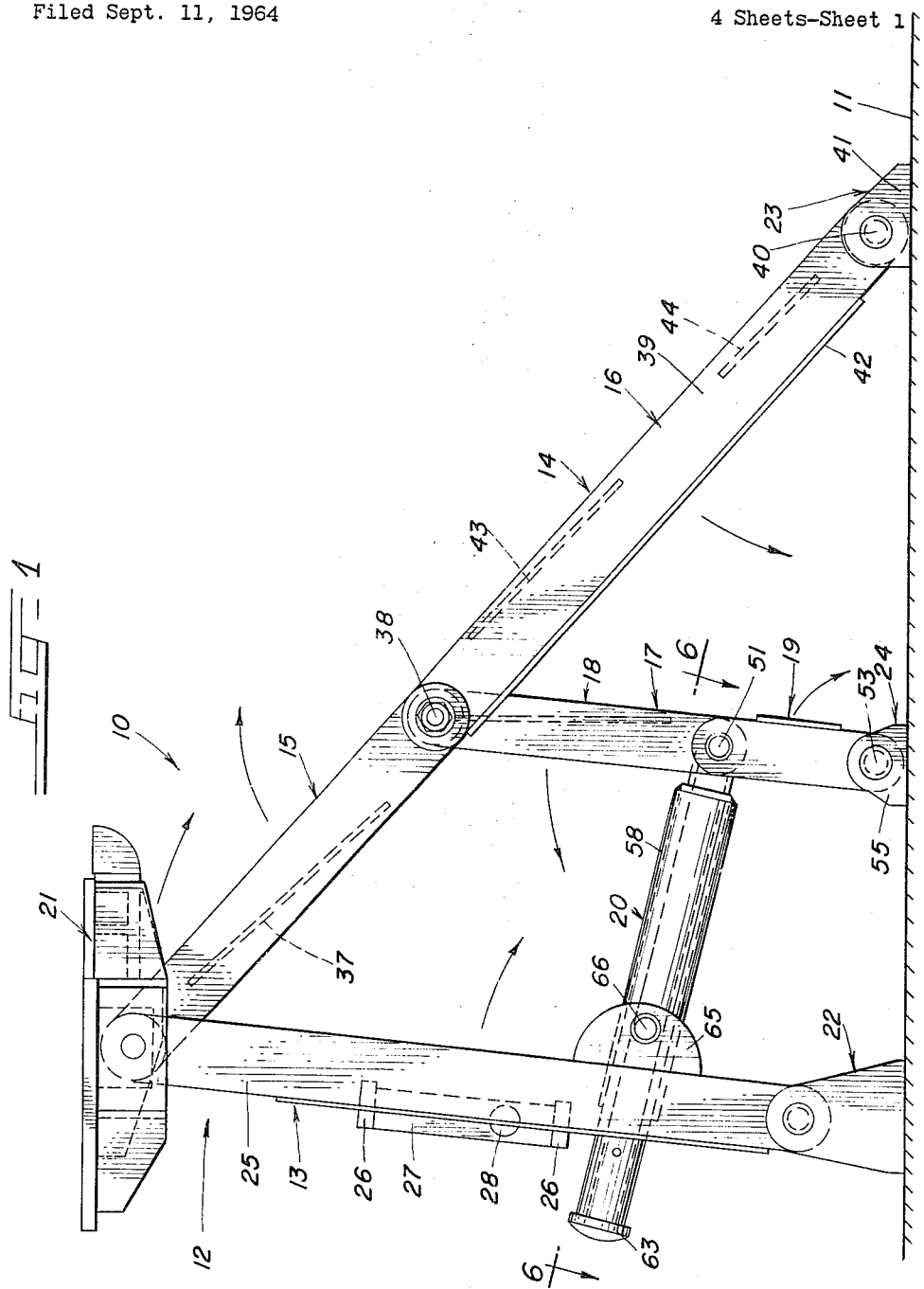
INVENTOR.
RAY L. FERRIS Jan. 11, 1966 R. L. FERRIS 3,228,641
FOLDABLE FIFTH WHEEL STANCHION
Filed Sept. 11, 1964 4 Sheets-Sheet 2
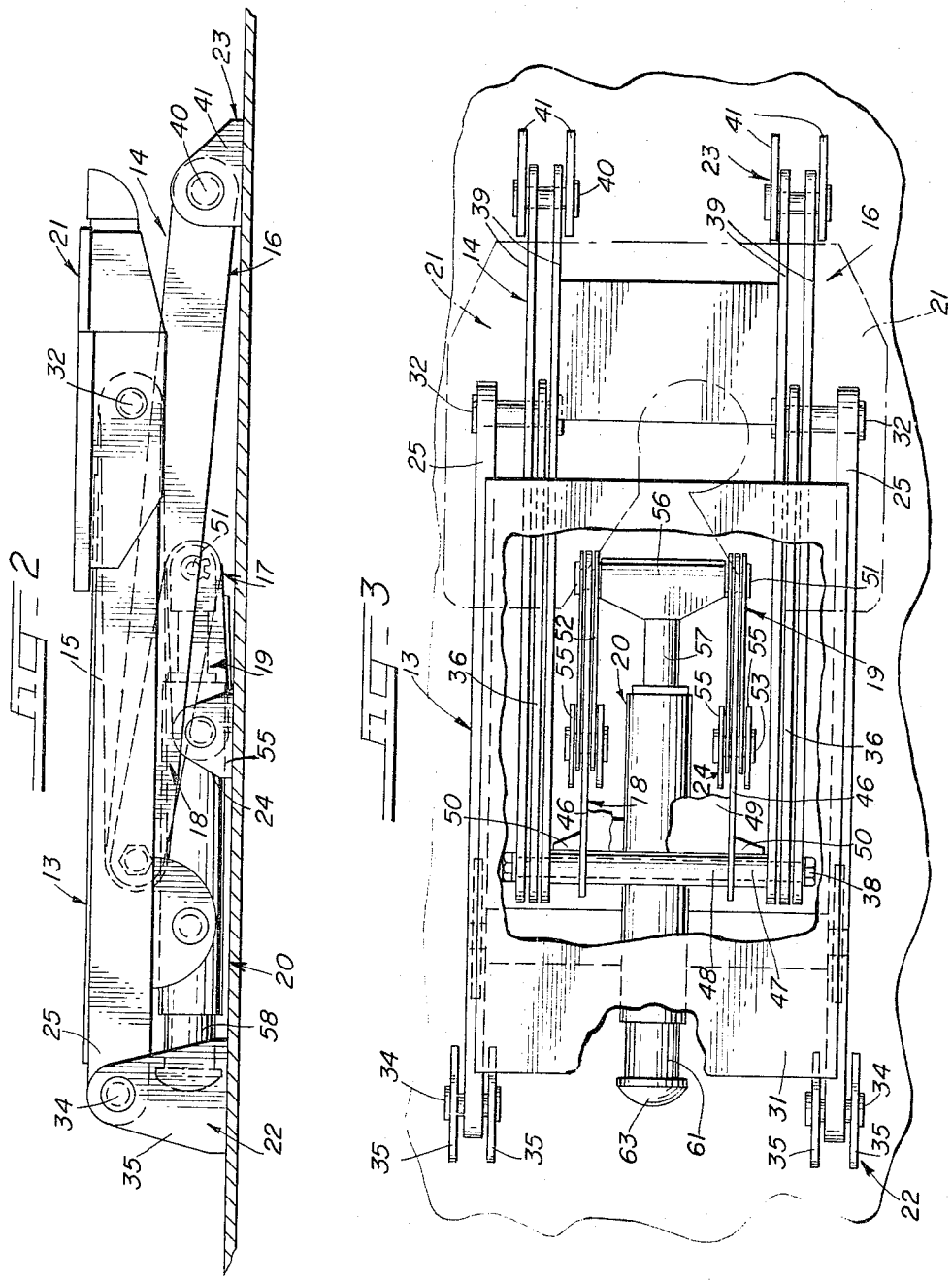
INVENTOR.
RAY L. FERRIS
BY

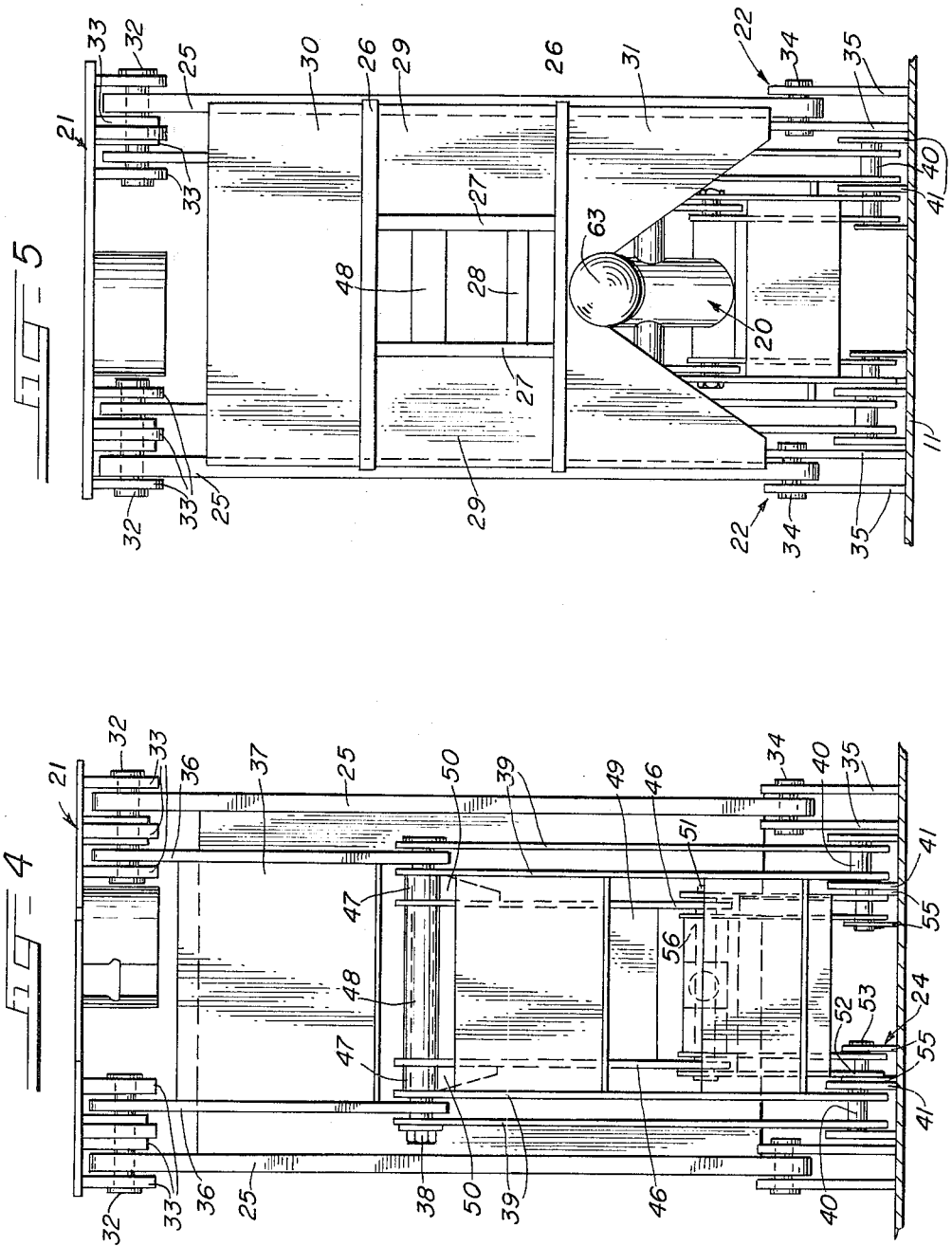

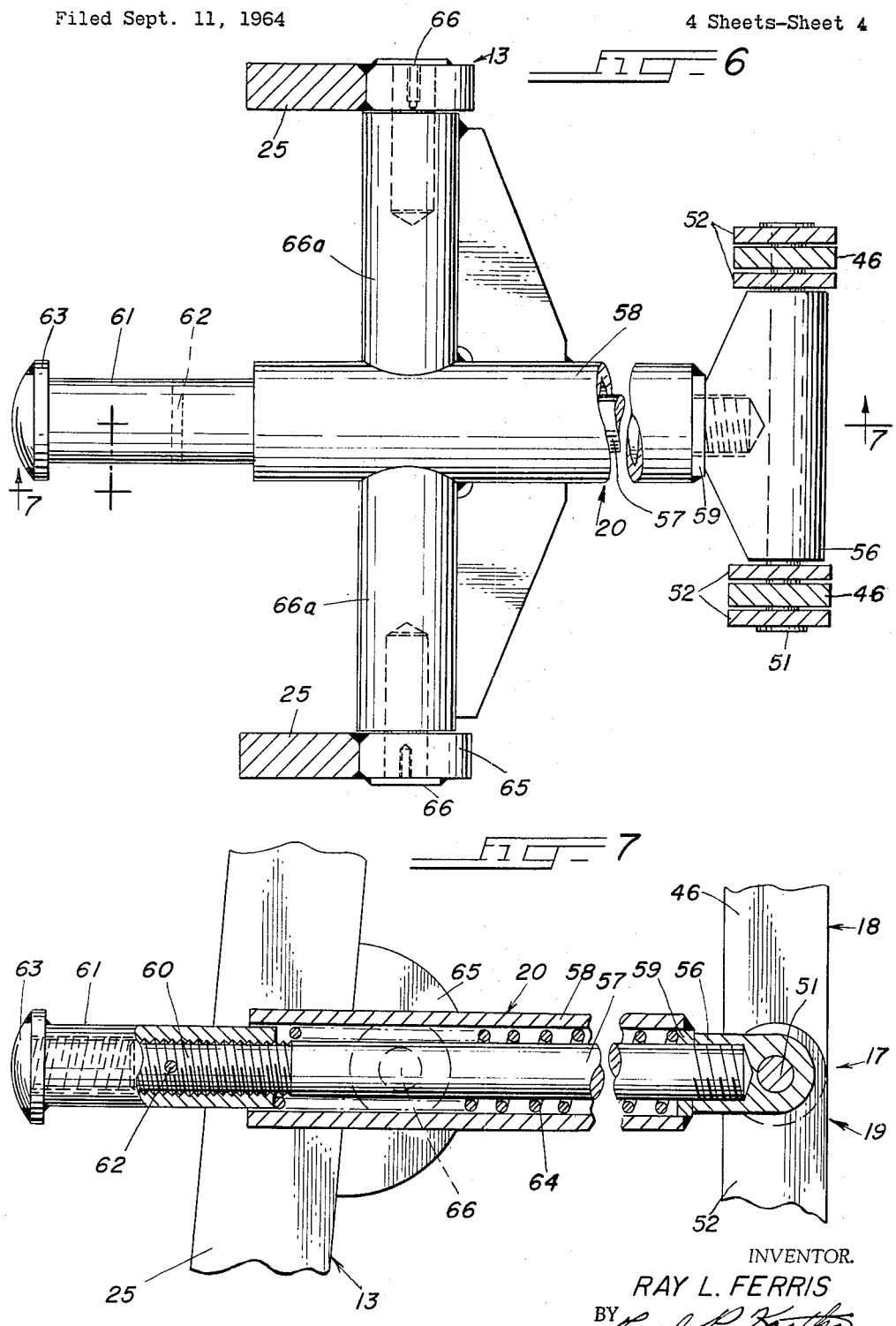

United States Patent Office 3,228,641
Patented Jan. 11, 1966

3,228,641
FOLDABLE FIFTH WHEEL STANCHION
Ray L. Ferris, Thornton, Ill., assignor to Pullman Incorporated, Chicago, Ill., a corporation of Delaware
Filed Sept. 11, 1964, Ser. No. 395,740
4 Claims. (Cl. 248—119)

The present invention relates to stanchions of the type employed in hitching a trailer on a flat car, and more particularly, to a trailer hitching stanchion which is movable between an erect trailer supporting position and a collapsed position adjacent to the railway car floor on which the stanchion is adapted to be mounted.

It is an object of the present invention to provide a collapsible stanchion including an upright strut and a foldable diagonal strut which are constructed and arranged to be pivotal about a fixed base pivot to form a substantially triangular support in the erect operative position thereof and wherein there is provided a foldable intermediate strut which coacts with said foldable diagonal strut for supporting the latter in a rigid linear relationship in the erect operative position of the stanchion.

It is another object to provide a collapsible stanchion including an upright strut and a diagonal strut which is foldable about a pivot intermediate the ends thereof and forms substantially triangular support in the erect operative position and wherein there is provided an intermediate stut including a pair of pivotal and foldable members which coact with said foldable diagonal strut at the pivot about which the diagonal strut is foldable for supporting the latter in a substantially rigid linear relationship in the erect operative position.

It is still a further object, taken in conjunction with the immediately foregoing object, to provide a latching arrangement for coacting with the folding intermediate strut so as to prevent the stanchion from collapsing in the erect operative position thereof.

Other objects and features will hereinafter appear.

In the drawings:

FIG. 1 is a side elevation view of a stanchion embodying the structure of the present invention and showing the stanchion in the erect operative position thereof;

FIG. 2 is a side elevational view of the stanchion but showing the stanchion in its collapsed or stored position;

FIG. 3 is a top plan view of the stanchion in the collapsed position with some of the parts being broken away to show underlying details of structure;

FIG. 4 is an end elevational view of the stanchion as viewed from the right side of FIG. 1;

FIG. 5 is a front elevational view of the stanchion as viewed from the left side of FIG. 1;

FIG. 6 is a fragmentary view taken generally along the lines 6—6 of FIG. 1;

FIG. 7 is a view taken generally along the lines 7—7 of FIG. 6.

Referring now to the drawings, there is shown a stanchion 10 mounted on a base 11 on which the stanchion is adapted to be mounted for the purpose of supporting and hitching trailers thereon for transit on a flat deck railway car. The stanchion 10 comprises generally a foldable fifth wheel support structure 12 including an upright strut 13, a diagonal strut 14 including an upper diagonal strut member 15 and a lower diagonal strut member 16, a foldable supporting or intermediate strut 17, which includes a first intermediate strut 18 and a second intermediate strut 19, and a latch arrangement 20 for holding the support structure in an erect upright position, and a fifth wheel plate assembly 21 pivotally secured to the upper ends of the foldable support structure 12.

The upright strut 13 is pivotally connected at the lower end thereof to an upright strut pivot 22 and the diagonal strut 14 is pivotally connected to a diagonal strut pivot 23. Both the upright and diagonal strut pivots 22 and 23 are fixedly secured to the base 11 which may be formed by the railway car floor or a separate member attachable to the car floor. The intermediate strut 17 is pivotally fixed at one end to an intermediate strut pivot 24 disposed between the upright strut pivot 22 and diagonal strut pivot 23.

As shown, the upright strut 13 includes a pair of laterally spaced legs 25—25. Fixed across the legs 25—25 is a pair of lengthwise spaced transversely extending braces 26—26 between which there is fixed a pair of transversely spaced vertical braces 27—27 which support a hook connecting or lifting bar 28 adapted to receive a hook (not shown) or the like attached to the tractor for elevating the stanchion 10 as more fully to be explained hereinafter. Extending between adjacent ones of the strut members 25 and the vertical braces 27 are reinforcing plates 29—29. A similar reinforcing plate 30 is connected above the upper of the transversely extending reinforcing bars 26 between the legs 25—25. A V-notched reinforcing plate 31 is fixed to the lower of the transversely extending reinforcing members 26 and between the strut legs 25—25.

The upper end of each of the legs 25—25 is pivotally connected by means of a pivot pin 32 to downwardly depending and spaced flange 33 fixed to the underside of the fifth wheel plate assembly 21. The lower end of each of the legs 25—25 is connected by means of a pivot pin 34 to the upstanding brackets 35—35 forming the upright strut pivots 22 and fixed to the base 11 as by welding.

The first or upper diagonal strut member 15 includes transversely spaced upper diagonal strut legs 36—36 of which the upper ends are disposed between pairs of brackets 33 depending from the underside of the fifth wheel plate assembly 21. The upper ends of the legs 36—36 are turnable about the pivot pin 32 which may be common for pivotally mounting the upper end of the upright strut legs 25—25. Reinforcing the strut legs 36—36 is a reinforcing plate 37 fixed across the inner faces thereof. At the lower ends the legs are pivotally supported by a pivot shaft 38 which is supported by and spans the upper ends of the transversely spaced pairs of lower diagonal strut legs 39—39 of the lower diagonal strut member 16. The lower ends of the legs 39—39 are mounted as by means of pivot pins 40 to brackets 41—41 which are fixed as by welding to the base or floor 11. The brackets 41—41 and pivot pin 40 form the diagonal strut pivot 23. Fixed across each of the outer ones of the pairs of legs 39—39 is a reinforcing plate 42 and fixed across the inner faces of the inner ones of the legs 39—39 are reinforcing plates 43 and 44. The reinforcing plates 37 on the upper diagonal strut member 15 and the reinforcing plates 43 and 44 on the lower diagonal strut 16 are located so as to permit the stanchion to be collapsed as shown in FIG. 2.

The intermediate strut 17 is disposed between the upright strut 13 and the diagonal strut 12 and includes the upper or first intermediate strut member 18 and the lower intermediate strut member 19. The upper intermediate strut member 18 includes a pair of transversely spaced upper intermediate strut legs 46—46, connected at the upper ends to the pivot shaft 38 which connects the upper and lower diagonal strut legs 14 and 15. Maintaining the legs 46—46 spaced from the respective inner surfaces of the inner ones 39 of the lower diagonal strut members are spacer collars 47—47. Turnably disposed between the legs 46 is a reinforcing plate 49 which is fixed at its upper end to a spacer collar 48 and along the sides to the inner surfaces of the legs 47. Gussets 50 are fixed to the collars 47—47 and along the outer faces of the legs 46.

At the lower end, the legs 46—46 are fixed to the intermediate strut pivot shaft 51 which is supported between the upper ends of the pairs of transversely spaced lower intermediate strut legs 52—52. As shown in particular in FIG. 6 the lower ends of the upper intermediate strut legs 46—46 are disposed between the respective pairs of the lower intermediate strut legs 52—52 and pivotally mounted on the pivot pin 51. Fixed between the lower or second intermediate strut legs 52—52 is a brace plate 54. The lower ends of the lower intermediate strut legs 52—52 are pivotally supported by means of a pivot pin 53 on pivot brackets 55—55 fixed to the base 11 and forming the intermediate strut pivot 24.

Disposed about the intermediate strut pivot stud 51 as shown in particular in FIGS. 6 and 7, is a saddle member 56 of the support latch arrangement 20 and to which there is threadably fastened one end of a rod 57 which extends forwardly and outwardly of the upright strut 13. Coaxially disposed about the rod 57 is a cylindrical housing 58 to one end of which there is fixed an annular ring 59 which is slidable on the rod 57. The other end of the rod 57 projects beyond the upright strut 13 and is formed with a threaded end 60 on which there is secured as by threading a cap 61. Fixing the cap 61 against turning on the rod 57 is a dowel pin 62. At the outer end the cap 61 is formed with a head 63 which is adapted to be engaged by an abutment member (not shown) which is fixed to the tractor employed to haul the trailer on the railway car. Upon the application of a longitudinally applied impact on the button head 63, the stanchion 10 is rendered collapsible and drops to the position shown in FIG. 2 as more fully to be described hereinafter. Disposed within the housing 58 and about the circumference or periphery of the rod 57 is a compression spring 64 of which one end abuts against the annular collar 59 and the other end against the inner end of the cap 61. The housing 58 of latch arrangement 20 is fixed to the upright strut legs 25—25 by means of pivot brackets 65—65 and pivot pins 66 turnably supported in shafts 66a fixed to the housing 58. In the collapsed position the intermediate strut pivot stud 51 is displaced a greater distance from the pivot pin 60 than in the erect position such that the rod 57 is extended outwardly of the housing 58. In this position the inner end of the cap 61 is operative to compress the spring 64 so that during raising of the stanchion the force of the spring 64 acting between the inner end of the cap 61 and the collar 59 serves to force or bias the intermediate strut pivot stud forwardly and thereby move the upper and lower intermediate strut members into a linear position as shown in FIG. 1. Moreover, it should be readily apparent that the spring 64 is also operative to maintain the upper and lower intermediate strut members 19 and 18 in a substantially linear relationship. When thus held in linear relationship, the upper end of the upper intermediate strut member 18 which is connected to the pivot stud 38 also raises and holds the upper and lower diagonal struts 15 and 16 fixed. Thus, there is formed a substantially rigid triangular support for the fifth wheel plate assembly 21.

The fifth wheel plate assembly 21 may be of more or less conventional structure including the usual locking members for receiving the king pin depending from the underside of the trailer which is adapted to be hitched and supported on the stanchion. It should also be mentioned that ordinarily the stanchion 10 of the present invention will be mounted on a railway car including a cushioning arrangement which serves to cushion impacts applied on the car and thereby to prevent excessive damage to the stanchion or to the lading carried in the trailer.

To lower the stanchion 10 and to release it from the rigid erect position shown in FIG. 1, the tractor which is employed to position and remove trailers from railway cars is backed onto the car so that the rear end of the chassis approaches the upright strut and an abutment member (not shown) fixed to the tractor chassis engages the button head 63 on the end of the rod 57. Upon further backing of the tractor the rod 57 is moved inwardly against the force of the compression spring 64 and causes the intermediate strut pivot shaft 51 to be moved rearward such that the upper and lower intermediate struts 17 and 18 become foldable relative to each other. At the same time, this breaks the rigid connection at the pivot pin 38 connecting the upper and lower diagonal struts 14 and 15 such that the pivot pin 38 moves downwardly and the upper diagonal strut folds clockwise over the lower diagonal strut 14.

In the collapsed position shown in FIGS. 2 and 3 the lower intermediate strut member 19 lies on the base 11 with the pivot shaft 51 disposed between the diagonal strut pivot means 23 and the intermediate strut pivot means 24. The upper intermediate strut member 18 overlies the lower member 19 with the end connected to the diagonal strut pivot shaft 38 facing the upright strut pivot means 23. Embracing the folded intermediate strut 17 is the lower diagonal strut member 16 and superposed in folded relationship over the lower diagonal strut member 16 is the upper diagonal strut member 15. As heretofore mentioned, the braces or reinforcing plates 37, 43 and 40 of the respective upper and lower strut diagonal strut members 15 and 16 are arranged so as to permit the nesting thereof.

The elevation of the stanchion 10 is accomplished by means of a hook or the like which is actuated by suitable mechanism mounted on the tractor employed to move the trailer. The hook is attached to the elevation bar or cable connecting bar 28 and as the tractor is operated, the vertical strut 13 is turned about the pivot 22 to the position shown in FIG. 1. During such movement the diagonal strut 14, of which the upper diagonal strut member 15 is pivotally secured to the fifth wheel plate assembly is unfolded about the pivot means 38 and assumes the rigid linear position shown in FIG. 1 with the lower diagonal strut member 16 which has pivoted about the pivot means 23. Movement of the pivot 38 to the position shown also unfolds the intermediate strut members 18 and 19 to the substantially rigid linear position. The latching of the intermediate strut members 18 and 19 into the rigid linear relationship to hold the pivot pin 38 of the diagonal strut members fixed is accomplished by the latching mechanism 20.

As heretofore described, the latching is accomplished by the force of the compression spring 64 which serves to draw the rod 57 fixed to the pivot 51 to the right so that the pivot 51 remains stationary. In this stationary position the upper and lower intermediate strut members 18 and 19 respectively are maintained in the linear relationship shown in FIG. 1 so that the pivot 38 is held against movement.

What is claimed is:

1. A stanchion for use in hitching a trailer on a railway flat car between a collapsed position and an erect position forming a substantially triangular support, said stanchion comprising a base, an upright strut pivotally mounted on said base, a foldable diagonal strut pivotally mounted on said base and connected to said upright strut so that said diagonal strut is unfolded to form a linear strut when the upright strut is turned to said operative erect position, foldable intermediate means connected between said base and said foldable diagonal strut being operative in the unfolded position thereof to prevent said diagonal strut from folding in the operative position of said stanchion and spring biased means disposed between said upright strut and said intermediate strut means for maintaining intermediate strut unfolded.

2. A stanchion for use in hitching a trailer on a railway flat car and movable from a collapsed position to an erect postion forming a substantially triangular support, said stanchion comprising a base, an upright strut connected at one end to an upright strut pivot means fixed to said base, a diagonal strut including an upper diagonal strut member and a lower diagonal strut member, pivot means connecting the adjacent ends of said upper and lower strut members, said lower diagonal strut member being connected to a diagonal strut pivot means fixed to said base and spaced lengthwise from said upright strut pivot means, said upper diagonal strut being pivotally connected relatively to said upright strut, a fifth wheel hitching and support plate assembly pivotally supported on said upright struts, an intermediate strut including a first intermediate strut member and a second intermediate strut member, said first intermediate strut member being connected at one end to said diagonal strut, said second intermediate strut member being connected at one end to a pivot means fixed to said base intermediate said upright strut pivot means and said diagonal strut pivot means, second pivot means connecting said other adjacent ends of said first and second intermediate strut members and spring biased latching means mounted between said upright strut and said intermediate strut for maintaining said first and second members in a substantially linear relationship and thereby to maintain said stanchion in said erect position.

3. The invention as defined in claim 2 wherein said first intermediate strut member is connected at said one end to said pivot means connecting said adjacent ends of said upper and lower diagonal strut members.

4. The invention as defined in claim 2 wherein said first intermediate strut member is connected at said one end to said pivot means connecting said adjacent ends of said upper and lower diagonal strut members and spring biased latching means is connected to said second pivot means connecting said other adjacent ends of said first and second intermediate strut members to hold the latter two strut members in linear relationship and maintain said pivot means connecting said adjacent ends of said upper and lower diagonal struts fixed and thereby retain said stanchion in said erect position until said spring biased latch is released.

References Cited by the Examiner
UNITED STATES PATENTS

| | | | |
|---|---|---|---|
| 968,836 | 8/1910 | Danforth | 248—240.3 |
| 1,608,036 | 11/1926 | Robinson | 248—240.3 |
| 3,041,028 | 6/1962 | McDowell | 248—119 |

CLAUDE A. LE ROY, *Primary Examiner.*

R. P. SEITTER, *Assistant Examiner.*